(12) United States Patent
Winkle et al.

(10) Patent No.: US 7,971,331 B2
(45) Date of Patent: Jul. 5, 2011

(54) SPRING TESTING APPARATUS AND METHOD

(75) Inventors: Scott J. Winkle, Cloverdale, OH (US);
David B. Erhart, Kalida, OH (US)

(73) Assignee: The Schnipke Family LLC, Ottoville, OH (US)

( * ) Notice: Subject to any disclaimer, the term of this patent is extended or adjusted under 35 U.S.C. 154(b) by 1075 days.

(21) Appl. No.: 11/753,680

(22) Filed: May 25, 2007

(65) Prior Publication Data
US 2008/0289164 A1    Nov. 27, 2008

(51) Int. Cl.
*B23Q 17/00* (2006.01)
*G01L 1/00* (2006.01)

(52) U.S. Cl. ............... 29/407.01; 29/407.08; 29/407.09; 73/862.381; 73/161

(58) Field of Classification Search ............... 29/407.01, 29/407.05, 407.08, 407.09, 896.9; 73/161, 73/862.381
See application file for complete search history.

(56) References Cited

U.S. PATENT DOCUMENTS

| | | | | |
|---|---|---|---|---|
| 3,675,479 A | * | 7/1972 | Carlson | 73/161 |
| 4,157,033 A | * | 6/1979 | Shereda et al. | 73/161 |
| 4,312,363 A | * | 1/1982 | Rothfuss et al. | 600/587 |
| 5,653,928 A | | 8/1997 | Schnipke | |
| 5,832,774 A | * | 11/1998 | Smith | 73/161 |
| 5,836,147 A | | 11/1998 | Schnipke | |
| 6,094,980 A | * | 8/2000 | Larson et al. | 73/161 |
| 6,158,205 A | | 12/2000 | Schnipke et al. | |
| 6,289,744 B1 | * | 9/2001 | Larson et al. | 73/847 |
| 6,729,119 B2 | | 5/2004 | Schnipke et al. | |
| 6,973,770 B2 | * | 12/2005 | Schnipke et al. | 59/71 |
| 6,990,796 B2 | * | 1/2006 | Schnipke et al. | 59/71 |
| 7,207,168 B2 | | 4/2007 | Doepker et al. | |
| 2010/0213240 A1 | * | 8/2010 | Kostrzewski | 227/180.1 |

FOREIGN PATENT DOCUMENTS

GB      2062168 A  *  5/1981

* cited by examiner

*Primary Examiner* — Essama Omgba
(74) *Attorney, Agent, or Firm* — Jason H. Foster; Kremblas & Foster

(57) ABSTRACT

A force measuring apparatus and method for testing a spring for a surgical cartridge. The apparatus and method permit an operator to measure the force applied by the spring when it is in the state it will be in when mounted in a cartridge. Therefore, a spring that exerts an insufficient force is rejected, and a spring that exerts a sufficient force is accepted and then mounted in a cartridge. A rejected spring is ejected from a pocket in the apparatus, and an accepted spring is mounted in the cartridge.

9 Claims, 4 Drawing Sheets

# SPRING TESTING APPARATUS AND METHOD

(e) BACKGROUND OF THE INVENTION

1. Field of the Invention

This invention relates generally to an apparatus and a method for inserting discrete articles into surgical cartridges, and more particularly to an improved device and method for inserting springs into surgical stapling cartridges.

2. Description of the Related Art

In the field of microsurgery, a surgical instrument having a cutting blade traverses a specific path through tissue. One feature of the surgical instrument is a single-use cartridge that is a holder for surgical staples. The cartridge is an elongated plastic body with a longitudinal channel that serves as a guide for a surgical blade. The cartridge has rows of small staples on opposite sides of the channel, and these rows are aligned parallel to the guide channel. Drivers are inserted in apertures (also called "pockets") aligned with the rows in order to push the staples out of the cartridge and through the adjacent tissue. Before the blade has made its cut, each side of the incision is stapled together by displacing the drivers relative to the cartridge. This displacement forces the staples against an anvil on the opposing side of the surgical instrument as the cartridge and the anvil deflects the points of the staples into a clasping position.

There may be as many as fifty or more very small staples on each side of a two-inch incision. Each staple can be driven into the tissue to close the incision by the correspondingly small drivers. The task of inserting the drivers into the cartridge is labor-intensive due to the small size of the drivers.

It is known in the prior art to insert drivers mechanically into surgical stapling cartridges, as shown in U.S. Pat. No. 5,836,147 to Schnipke, U.S. Pat. No. 5,653,928 to Schnipke, U.S. Pat. No. 6,158,205 to Schnipke et al., and U.S. Pat. No. 7,207,168 to Doepker et al., all of which are incorporated herein by reference. Workers manually position the cartridges, and the holders that contain the drivers relative to the machine, in the machines disclosed in these patents, and then actuate the machine to insert the tiny drivers into the pockets in the cartridges. After a fraction of the total number of drivers is inserted by one machine, the cartridge is then manually transported to the next machine, which inserts another fraction of the drivers. In U.S. Pat. No. 6,729,119 to Schnipke et al., which is incorporated herein by reference, a robotic loader is described for use in filling the cartridges discussed herein with the use of fewer workers than the prior art.

During the surgical procedure in which the surgical cartridges described above are used, the surgeon displaces two "sleds" longitudinally by manually depressing a trigger or otherwise actuating the surgical device that holds the cartridge. During this actuation, the sleds of the cartridge drive the drivers out of their home position, thereby driving the staples into the tissue, and a knife is displaced to make the incision. It is important that the knife make the incision either after, or while, the staples are driven into the tissue. In order to prevent a surgeon from mistakenly making another incision with a cartridge that has already driven its staples, a small, V-shaped lockout spring is mounted in the cartridge at the end near the sleds. This V-shaped spring has two legs that expand outwardly to occupy a portion of the space that the sleds occupy in their home positions. When the legs are in the expanded position, the spring acts as a "barb" that prevents the surgical device in which the cartridge is mounted from making a second incision without a new cartridge. This spring feature is obviously important to the safe operation of the cartridge, and therefore, the surgical instrument in which the cartridges are inserted.

It is known to insert springs into the cartridges by mechanical means, such as by pre-compressing the springs and forcing them mechanically downwardly into the slot between the opposing sleds. There is, however, no way known to Applicants to rapidly and conveniently test springs prior to insertion to determine if they have sufficient spring force to work properly as the required safety feature.

Therefore, there is a need for a machine for testing and loading springs into surgical cartridges.

(f) BRIEF SUMMARY OF THE INVENTION

An apparatus for testing a spring's suitability for use in a surgical staple cartridge. The apparatus comprises a cartridge-receiving plate having a channel configured to receive a cartridge. The cartridge-receiving plate has a preferably tapered track formed above the cartridge-receiving plate and configured to receive a spring. Thus, a spring mounted in the track is compressed as it is displaced through the track. A pocket is disposed preferably above the channel of the cartridge-receiving plate and at the end of the track. Thus, the pocket receives the spring after it has been displaced through the track and compressed. A load cell is mounted with a sensing finger at the pocket so that it can contact a first leg of the spring in the pocket, and thereby measure a force the spring applies in a compressed state. This compressed state is preferably substantially the same state the spring takes when mounted in the cartridge. A plunger aligned with the pocket forces the spring downwardly toward the channel.

If the spring exerts sufficient force against the load cell, the spring is mounted in a cartridge. If not, then a rejection tube is displaced by a first prime mover so that its receiving end is disposed beneath the pocket. In a preferred embodiment the spring is displaced in the track to the pocket by a spring push bar drivingly linked to a second prime mover and mounted in the track.

The invention also contemplates a method of testing a spring's suitability for use in a surgical staple cartridge. The method comprises disposing the cartridge in the channel of the cartridge-receiving plate and disposing the spring in the track formed above the cartridge-receiving plate. The spring is displaced through the track to a pocket at the end of the track and disposed above the channel of the cartridge-receiving plate. This step thereby compresses the spring to a compressed state, in which a force-measurement means can measure the force the spring applies at the pocket. Preferably after measuring the force the spring applies, the spring is forced downwardly toward the channel with a plunger aligned with the pocket. If the spring is to be rejected, a receiving end of a reject tube is displaced toward the pocket for receiving the spring.

The apparatus and method permit an operator to measure the force applied by the spring when it is in the state it will be in when mounted in a cartridge. Therefore, a spring that exerts an insufficient force is rejected, and a spring that exerts a sufficient force is accepted and then mounted in a cartridge.

(g) BRIEF DESCRIPTION OF THE SEVERAL VIEWS OF THE DRAWINGS

Figure 1:
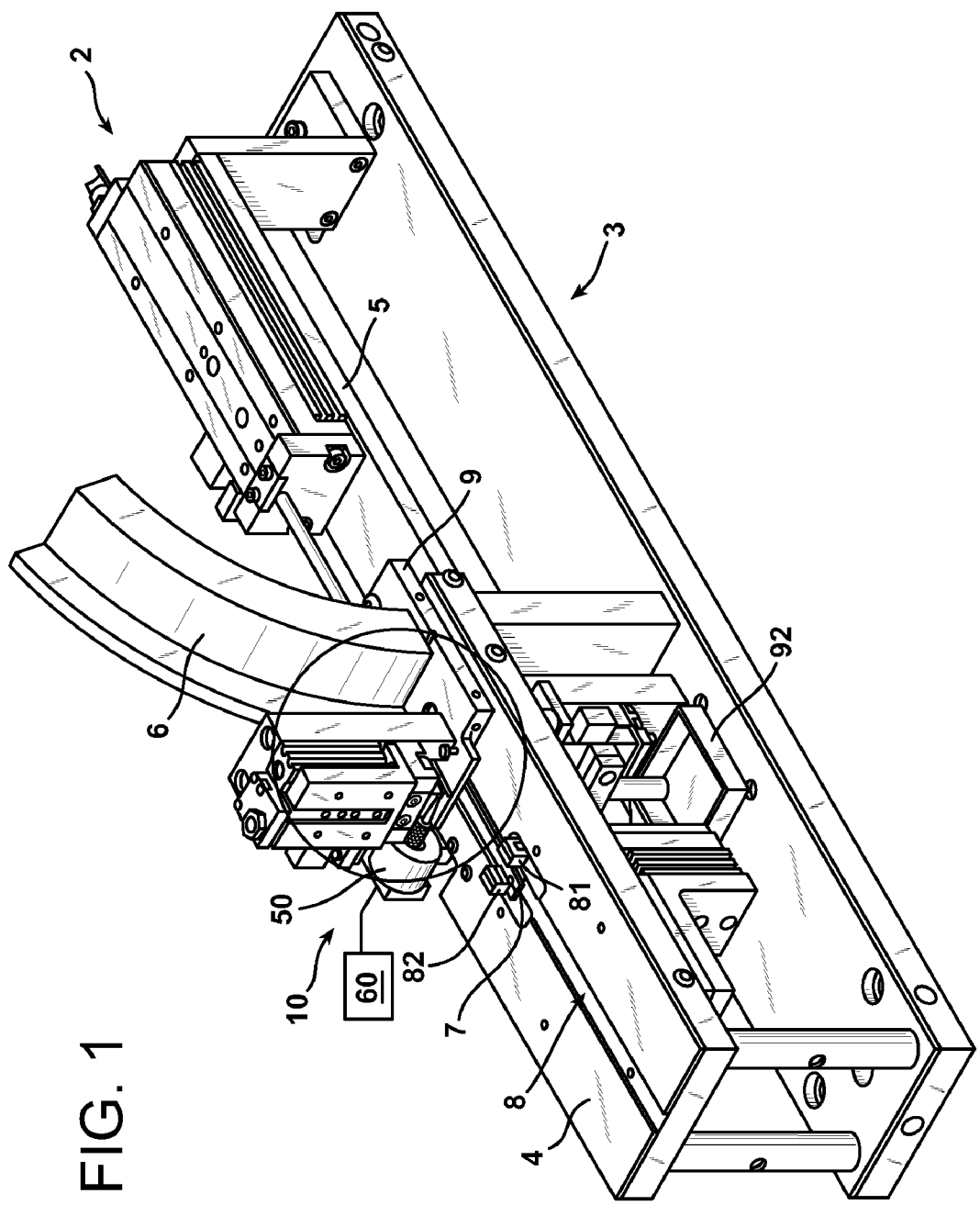
FIG. 1 is a view in perspective illustrating a spring testing apparatus and method that operates in accordance with the invention mounted to a spring inserting machine.

In describing the preferred embodiment of the invention, which is illustrated in the drawings, specific terminology will be resorted to for the sake of clarity. However, it is not intended that the invention be limited to the specific term so selected and it is to be understood that each specific term includes all technical equivalents that operate in a similar manner to accomplish a similar purpose. For example, the word connected or term similar thereto are often used. They are not limited to direct connection, but include connection through other elements where such connection is recognized as being equivalent by those skilled in the art.

(h) DETAILED DESCRIPTION OF THE INVENTION

The spring inserting apparatus 2 shown in FIG. 1 has a frame 3 that provides the structural support for the remaining components described herein. The table 4 and the platform 5 are part of the frame 3, and are preferably horizontally disposed in an operable orientation. During operation, a cartridge 7 is inserted into the groove 8 formed in the table 4, and the conduit 6 conveys a spring 20 (see FIG. 3) into the spring testing and loading apparatus 10 for subsequent insertion into the cartridge 7. As an example, the conduit 6 can be part of a conventional bowl feeder and track system sold by Service Engineering.

Figure 3:
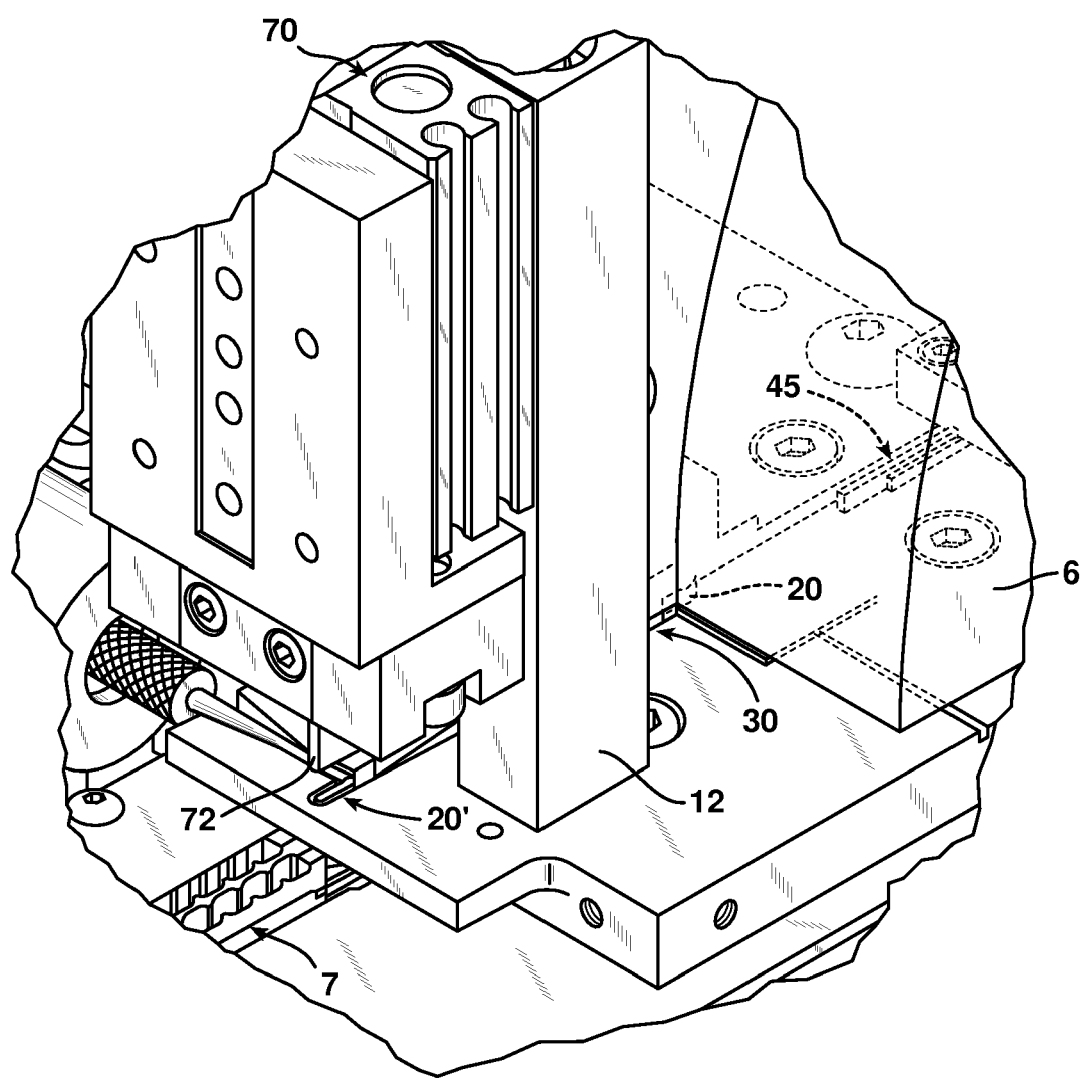
FIG. 3 is an enlarged view illustrating the encircled portion of FIG. 1.

The spring testing and loading apparatus 10 is rigidly mounted to the table 4, and receives springs in a preferred orientation from the conduit 6 in a conventional manner. The springs, an example of which is the spring 20 shown in FIG. 3, are conventional, V-shaped leaf springs, and are received by the apparatus 10 at the track 30. The track 30 extends beyond the frame member 12 to the pocket 32, in which the spring is shown disposed in FIG. 4 by reference numeral 20'. The method and mechanisms by which springs are conveyed after deposit in the track 30 by the conduit 6, tested, approved/rejected, and inserted into the cartridge are the subject of the invention.

Figure 2:
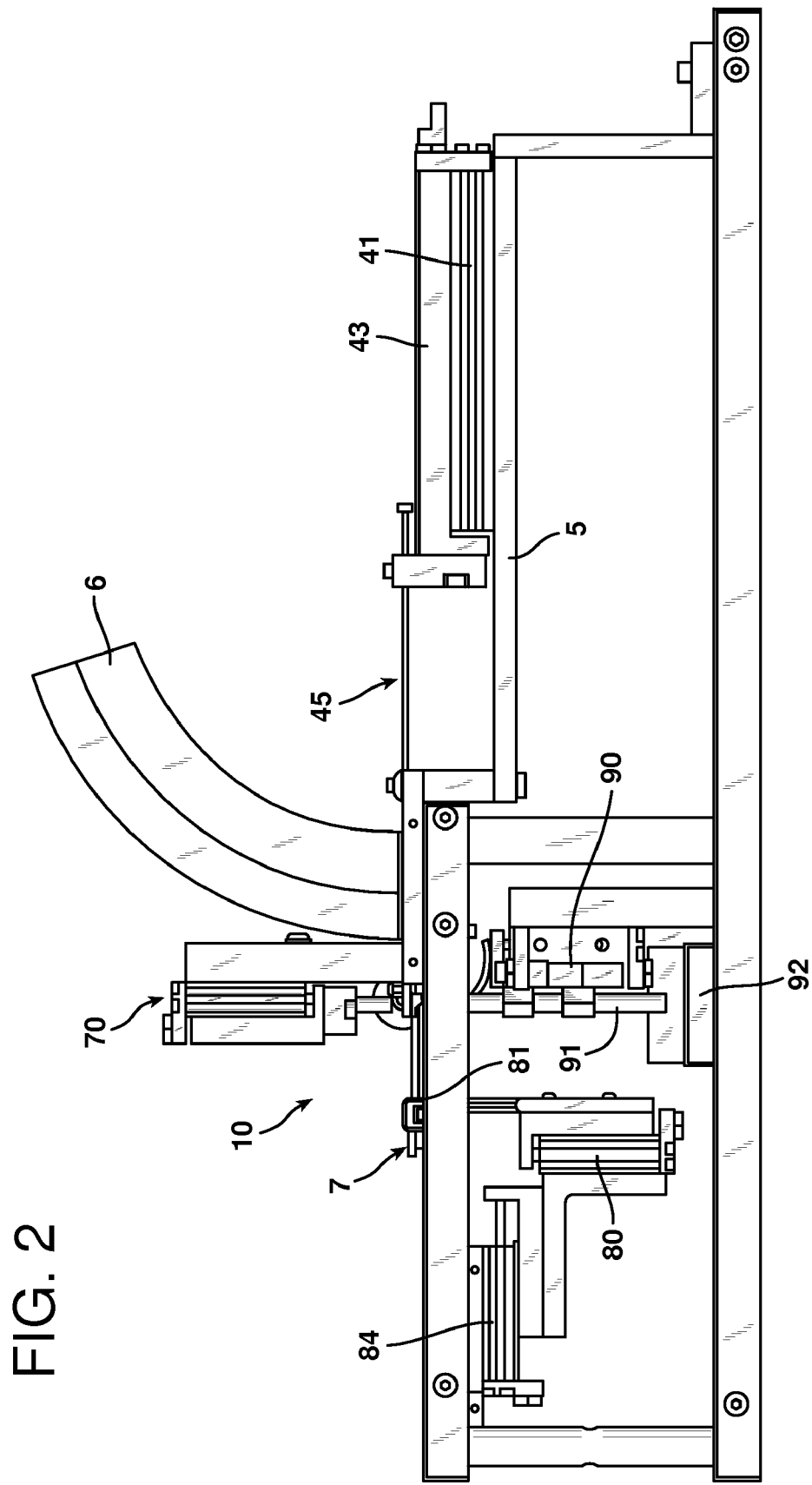
FIG. 2 is a side view illustrating the machine of FIG. 1.

Referring to FIGS. 1 and 2, a prime mover, such as the pneumatic cylinder 41, is rigidly mounted by its housing to the platform 5, and its driven rod is linked to the rigid L-bracket 43. The spring push bar 45, which an elongated strip of preferably substantially stiff metal, is rigidly mounted to the L-bracket 43, and extends through the track 30 (see FIG. 3) toward the pocket 32, which is illustrated in the cut away view of FIG. 4. The spring push bar 45 has a tongue 44 that extends from the tip of the spring push bar 45 a small distance. This small distance, which is approximately 5 to 10 millimeters, is substantially equal to the length of the spring 20, as explained further below.

Thus, by actuating the cylinder 41 in one direction, the L-bracket 43 is displaced, thereby displacing the spring push bar 45 toward the pocket 32, from the position shown in FIG. 3. This distance can be, for example, approximately three inches. This distance is only exemplary, and can vary as will be understood by the person having ordinary skill. By actuating the cylinder 41 in the opposite direction, the L-bracket 43 is displaced away from the pocket 32.

Figure 4:
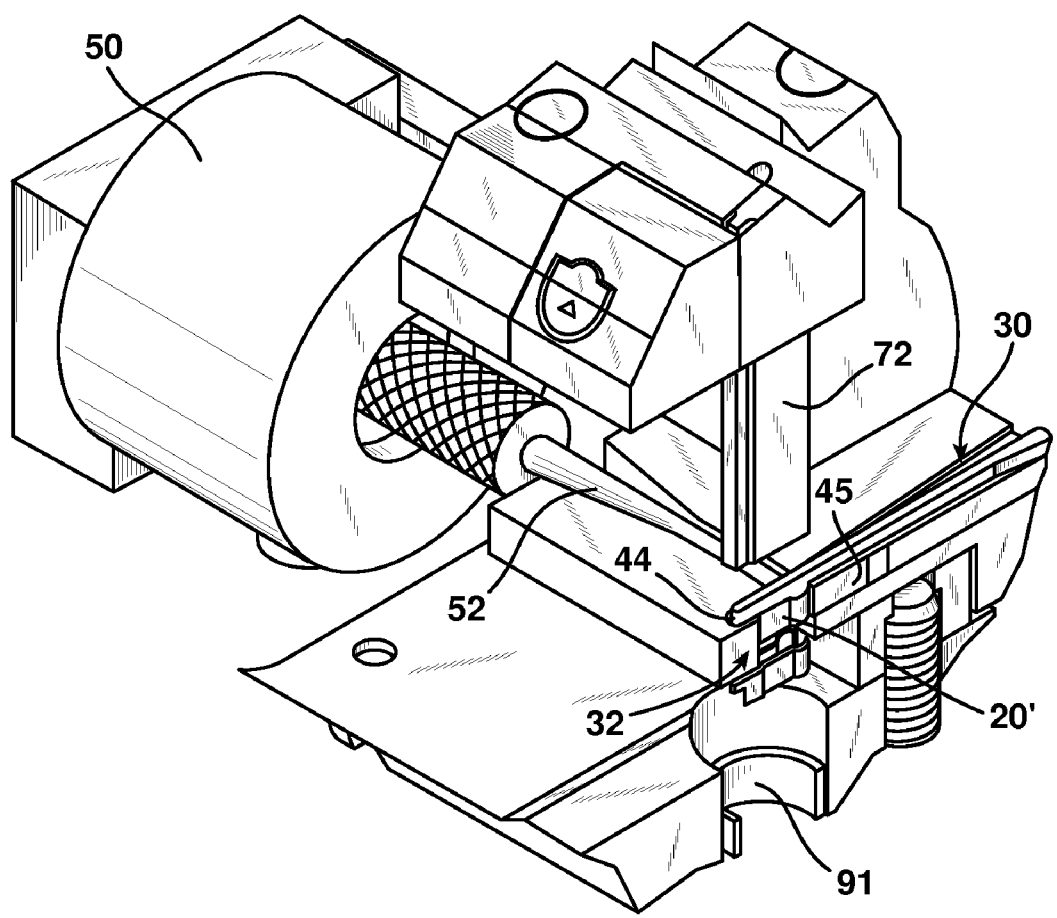
FIG. 4 is an enlargement of the view of FIG. 3 with some structural features removed for clarity.

By actuating the cylinder 41 toward the pocket 32, the spring push bar 45 is displaced until its tip, which began on the cylinder 41 side of the conduit 6, is inserted into the spring 20. The cylinder 41 continues on, thereby driving the spring toward and into the pocket 32 as shown in FIG. 4.

The spring 20 is compressed as it is displaced along the track 30, because the track 30 preferably tapers in width from the width of a relaxed spring (at the rightward position shown in FIG. 3) to the width of a compressed spring (at the leftward position shown in FIG. 3—in the pocket 32). By gradually compressing the spring during its movement from its placement in the track 30 to its deposit in the pocket 32, the spring is evenly and thoroughly compressed to the size that is ready for insertion into the cartridge.

The tongue 44 seats in the deepest region of the groove of the spring 20 when the spring push bar 45 is pushing the spring along the track 30 into the pocket 32, and the tip thereby acts as a fulcrum about which the legs of the spring 20 pivot during compression of the spring 20. Thus, as the spring 20 is driven toward the pocket 32 and the narrowing track 30 bends the legs of the spring 20 closer together, the spring compresses evenly on both sides of the tip of the spring push bar 45. When the spring is in the pocket 32, its legs are compressed to the position to which they will be compressed when inserted in the cartridge 7, such as about 0.085 inches apart. Additionally, one leg of the spring 20' seats against a load cell finger 52 as described below.

Once the spring is positioned in the pocket 32, the spring push bar 45 is retracted, at least out of the pocket area, and preferably back to the position shown in FIG. 3, so that it can prepare to push another spring into the pocket. Once the spring push bar 45 is retracted out of the pocket area, a force measurement means, such as the conventional load cell 50, is used to measure the force applied by the compressed spring 20. The load cell 50 has a load cell finger 52 that extends through a groove formed in the plate 9 that mounts rigidly to the table 4, as shown in FIG. 4.

The load cell 50 measures the precise outward spring force that the leg of the spring will exert against a cartridge 7, but takes this measurement prior to insertion into the cartridge 7. It should be noted that this measurement is immediately prior to the spring being inserted into the cartridge 7, which reduces the possibility that a later step could change the spring's characteristics from those measured. The load cell 50 then signals a computer and a pneumatic cylinder actuator (denoted in combination by the reference numeral 60 in FIG. 1) that is connected to the load cell 50 and the pneumatic cylinders described above and below. If the load cell calculates the force applied by the spring to be greater than a predetermined minimum, the spring is approved for use in the cartridge. If the load cell calculates the force applied by the spring to be equal to or less than a predetermined minimum, the spring is rejected. The next step in the process of testing and inserting a spring in the cartridge 7 is determined by the outcome of the load cell's 50 calculation.

If the spring is approved for use in the cartridge, a prime mover, such as the pneumatic cylinder 70 (see FIGS. 2 and 3), is actuated to drive the punch 72 downwardly to seat against the top of the spring 20. The punch 72 is driven further until the spring 20 protrudes out of the pocket 32 and extends its underside into the receiving slot (not shown) in the cartridge below. The punch 72 continues until the spring 20 is inserted in the cartridge in a conventional position. After the spring 20 is inserted into the cartridge, the spring push bar 45 is moved once again toward the pocket area, by actuating the cylinder 41, thereby driving a new spring along the track 30. The cartridge is also removed from the groove 8. This is effected, for example, by actuating a prime mover, such as the pneumatic cylinder 80, to drive the hooks 81 and 82 upwardly to release the cartridge. Another prime mover, such as the pneumatic cylinder 84, is then actuated to drive the cartridge away from the pocket 32, where it can then be manually removed.

If the spring is rejected for use in the cartridge, the cylinder 84 is actuated to drive the cartridge 7 away from the pocket 32 without actuation of the cylinder 80 to release the cartridge 7. Thus, although the cartridge is moved away from the pocket 32, it cannot be removed manually from the machine without displacing the hooks 81 and 82 upwardly. This movement of the cartridge, but retention of it to the machine, permits ejection of the spring without concern that someone will remove and use a cartridge that has no spring loaded in it.

With the cartridge away from the pocket 32 as shown in FIG. 4, a prime mover, such as the pneumatic cylinder 90 (see FIG. 2), is actuated to displace the upper end of the tubular rejection tube 91 vertically upwardly to seat against the underside of the pocket 32. Once this step has been carried out, the cylinder 70 is actuated, and the punch 72 is driven downwardly to push the spring 20 out of the pocket 32 as in the case of the spring being accepted. However, because the rejection tube 91 is beneath the pocket 32, the spring 20 falls downwardly through the rejection tube 91 to the rejection tray 92. Thus, the spring 20 is entirely removed from the machine, thereby preventing its accidental insertion into a cartridge. If there are a number of springs rejected above a predetermined maximum, such as three consecutive rejections, or five rejections in 100 springs tested, then the computer 60 signals the operator to notify maintenance personnel to check the machine for accuracy.

After the spring is rejected, a new spring is displaced through the track 30 by the spring pusher bar 45, and that new spring is displaced to the pocket 32 as described above for the spring 20. This new spring is then tested by the load cell 50 in the same manner, and either approved or rejected. It is preferred that, prior to testing the new spring, the cylinder 90 is actuated to retract the rejection tube 91, and the cartridge 7 is returned to the loading position by actuating the cylinder 84 to displace the cartridge toward the pocket 32. However, this is not required, as the cartridge can be kept at its retracted position, and the rejection tube 91 can be maintained at its rejection position, until an acceptable spring is tested. Once an acceptable spring is tested, it is driven into the cartridge as described above. The cartridge is then removed and another cartridge is inserted.

It is also preferred that as soon as the spring pusher bar 45 is withdrawn from the pocket 32, a new spring is placed in the track 30 so that no time is lost waiting for this step to be taken once the spring is ejected out of the pocket 32 by the punch 72. By carrying out the step of loading a new spring in the track 30 simultaneously with testing of the spring, the process is more efficient.

Although a load cell is described herein as the force-measuring means for determining whether a spring has a sufficient expansion force to be inserted into a cartridge, other equivalent force measuring devices can be used. For example, a calibration spring, such as a spring that expands with equivalent force, can be used to determine whether the spring being tested exerts a sufficient force. A load cell is typically an electronic transducer that is used to convert a force into an electrical signal. Hydraulic or hydrostatic load cells, piezoelectric load cells, and vibrating wire load cells, can be used. Additionally, the position of the load cell can be on the side opposite that shown, or there can be two opposing load cells.

Furthermore, although pneumatic cylinders are described herein as the prime movers, it will be apparent to the person having ordinary skill that other prime movers, including without limitation, hydraulic rams and linear electric motors, can be used as substitutes. Still further, although the machine illustrated drives springs downwardly into an awaiting cartridge, this configuration is merely the most convenient in most circumstances. The entire apparatus can be rotated 180 degrees, so that the springs are driven upwardly, for example, into the cartridge. Likewise, the apparatus can be rotated a portion of this amount, if it seems suitable for given circumstances, as will become apparent to the person having ordinary skill.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An apparatus for testing a spring's suitability for use in a surgical staple cartridge, the apparatus comprising:
   (a) a cartridge-receiving plate having a channel configured to receive a cartridge;
   (b) a track formed adjacent the cartridge-receiving plate and configured to receive a spring;
   (c) a pocket disposed at the end of the track adjacent the channel of the cartridge-receiving plate, the pocket being configured to receive the spring;
   (d) a force measurement means at the pocket for contacting the spring in the pocket and measuring a force the spring applies in a compressed state; and
   (e) a plunger aligned with the pocket for forcing the spring toward the channel.

2. The apparatus in accordance with claim 1, further comprising a rejection tube and a first prime mover for displacing the rejection tube relative to the pocket, the rejection tube having a receiving end mounted adjacent the pocket.

3. The apparatus in accordance with claim 2, further comprising a spring push bar drivingly linked to a second prime mover and mounted in the track for pushing the spring in the track to the pocket.

4. The apparatus in accordance with claim 3, further comprising a tongue extending substantially the spring's length from a tip of the spring push bar.

5. An apparatus for testing a spring's suitability for use in a surgical staple cartridge, the apparatus comprising:
   (a) a cartridge-receiving plate having a channel configured to receive a cartridge;
   (b) a tapered track formed above the cartridge-receiving plate configured to receive a spring;
   (c) a pocket at the end of the track disposed above the channel of the cartridge-receiving plate, the pocket being configured to receive the spring;
   (d) a load cell mounted with a sensing finger at the pocket for contacting a first leg of the spring in the pocket and measuring a force the spring applies in a compressed state;
   (e) a plunger aligned with the pocket for forcing the spring downwardly toward the channel;
   (f) a rejection tube and a first prime mover, the rejection tube having a receiving end mounted beneath the pocket;
   (g) a spring push bar drivingly linked to a second prime mover; and
   (h) a tongue extending substantially the spring's length from a tip of the spring push bar.

6. A method of testing a spring's suitability for use in a surgical staple cartridge, the method comprising:
 (a) disposing a cartridge in a channel of a cartridge-receiving plate;
 (b) disposing a spring in a track formed adjacent the cartridge-receiving plate;
 (c) displacing the spring through the track to a pocket at the end of the track and disposed adjacent the channel of the cartridge-receiving plate;
 (d) measuring a force the spring applies at the pocket to a force-measurement means; and
 (e) forcing the spring toward the channel with a plunger aligned with the pocket.

7. The method in accordance with claim 6, further comprising displacing a receiving end of a rejection tube toward the pocket for receiving the spring.

8. The method in accordance with claim 7, wherein the step of displacing the spring further comprises compressing the spring to a compressed state.

9. A method of testing a spring's suitability for use in a surgical staple cartridge, the method comprising:
 (a) disposing a cartridge in a channel of a cartridge-receiving plate;
 (b) disposing a spring in a track formed above the cartridge-receiving plate;
 (c) displacing the spring through the track to a pocket at the end of the track and disposed above the channel of the cartridge-receiving plate, thereby compressing the spring to a compressed state;
 (d) measuring a force the spring applies at the pocket to a force-measurement means;
 (e) forcing the spring downwardly toward the channel with a plunger aligned with the pocket; and
 (f) displacing a receiving end of a rejection tube toward the pocket for receiving the spring.

* * * * *